METHOD OF OPERATING A SINGLE-STAGE TRANSISTOR AMPLIFIER AS A LINEAR AMPLITUDE MODULATOR
Filed May 10, 1968
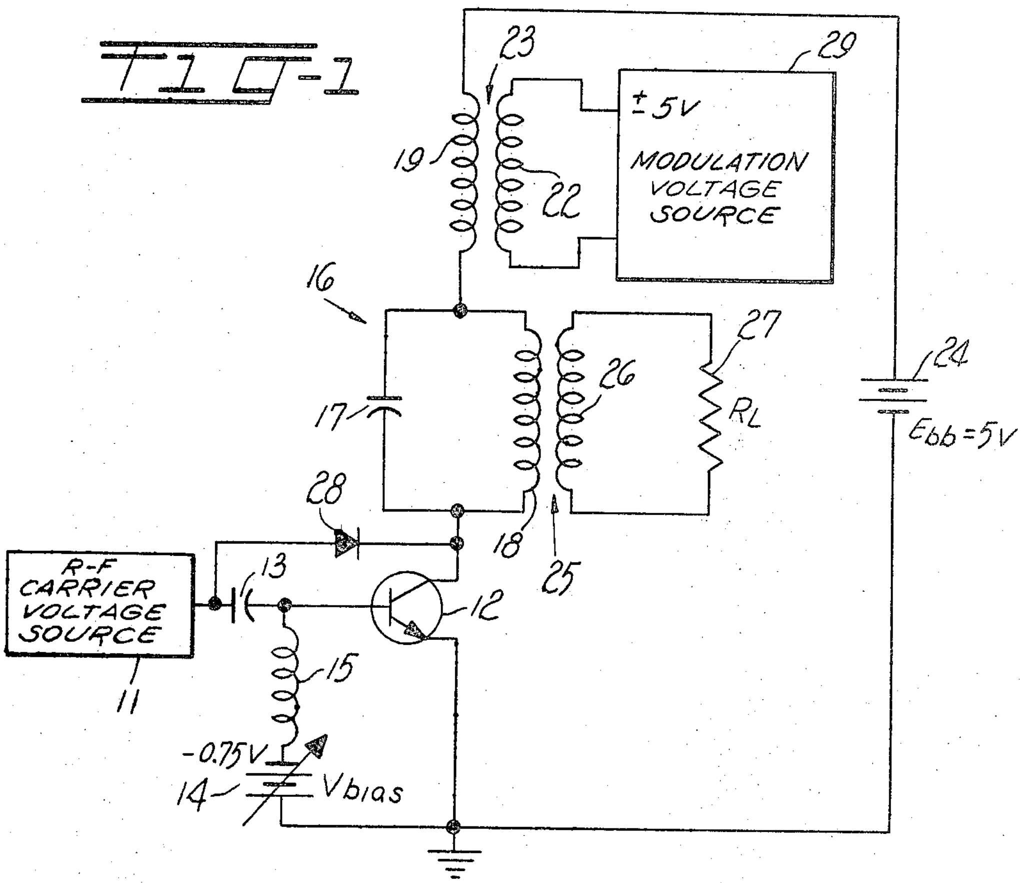
FIG-1
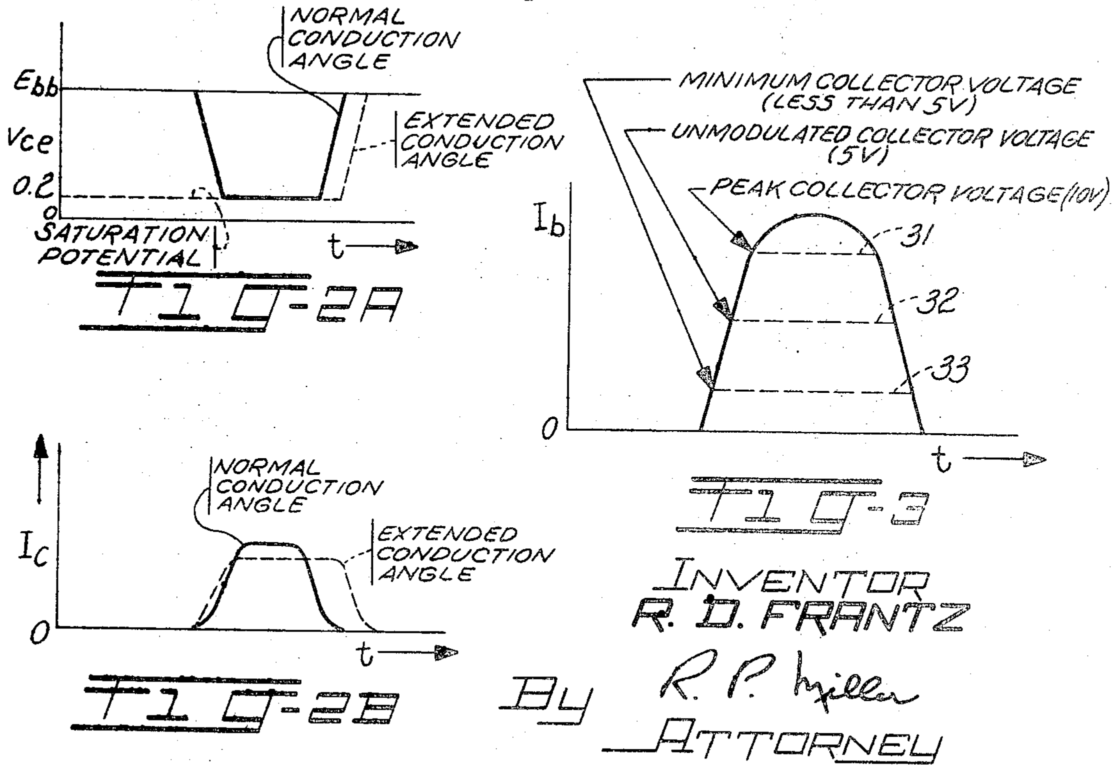
FIG-2A, FIG-3
FIG-2B
INVENTOR
R. D. FRANTZ
By R. P. Miller
ATTORNEY 3,539,947

METHOD OF OPERATING A SINGLE-STAGE AS A LINEAR AMPLITUDE MODULATOR

Robert D. Frantz, Temple, Pa., assignor to Western Electric Company, Incorporated, New York, N.Y., a corporation of New York Filed May 10, 1968, Ser. No. 728,246
Int. Cl. H03c *1/06*
U.S. Cl. 332—31 1 Claim

ABSTRACT OF THE DISCLOSURE

A carrier signal is impressed upon the base electrode of a transistor to generate an output signal and a modulation signal is impressed upon the collector electrode to modulate the output. A current diverting means is connected between the base circuit and collector electrode of the transistor. The current diverting means is actuated in response to an approaching condition of saturation in the transistor to divert base current from the base electrode to the collector electrode of the transistor to prevent saturation.

BACKGROUND OF THE INVENTION

Field of the invention

The invention relates to collector modulated transistor amplifiers. In a collector modulated transistor amplifier operating in the class C mode, maximum collector efficiency occurs when the transistor is driven from cutoff to the point where the transistor just reaches a condition of saturation. When the collector voltage of a transistor is held constant, it is a simple matter to adjust the maximum value of a sinusoidal base signal until the transistor is driven to the point of saturation on each cycle. However, the base current which is required to saturate a transistor will vary depending upon the value of the collector voltage and in a collector modulated amplifier, the collector voltage is varied to perform the function of modulation. For example, a carrier voltage connected to the base of a transistor which is large enough to drive the transistor to the point of saturation when the modulated collector voltage is at its minimum value will be insufficient to saturate the transistor when the modulated collector voltage is at its maximum value. Likewise, a carrier voltage on the base which is large enough to just drive the transistor to saturation when the modulated collector voltage is at its maximum value will drive the transistor deeply into saturation when the modulated collector voltage is at its minimum value When the transistor goes into saturation, minority carrier storage occurs in the collector region of the transistor. If the transistor is being driven into saturation at radio frequency, the time required to dissipate the stored charges is an appreciable fraction of the total cycle time and the result is an increase in the conduction angle of the transistor which causes a decrease in the collector efficiency of the transistor and thereby nonlinearity in the output signal of the amplifier.

Description of the prior art

In the past, one solution to the problem of driving a collector modulated transistor amplifier between cutoff and the point of saturation, even though the collector voltage is continuously varied, has been to vary the carrier voltage as a function of the modulating voltage by placing a plurality of partially modulated amplifier stages in cascade as input stages to supply a carrier signal to the final modulated amplifier. The gains and modulation factors of each of the input stages are adjusted so that the carrier voltage connected to the base of the transistor is varied in the same proportion as the modulation voltage. This system provides that there is always just enough base voltage to drive the transistor of the final modulated amplifier just to the point of saturation and not beyond, regardless of the modulated collector voltage. However, many problems are encountered with this modulation technique; such as: (1) the difficulty in obtaining a linear increase in carrier voltage at the base of the transistor for a given increase in modulation voltage; and (2) the difficulty of initially adjusting the modulation factor and gains of the previous stages to obtain a proper carrier voltage variation at the base of the final transistor.

In the prior art of switching circuits, it has been known to prevent saturation in a transistor by diverting current from the base electrode to the collector electrode. However, in a switching circuit the collector bias on the switching transistor is a constant value, whereas, in a modulated amplifier the problem of saturation is due solely to a varying collector voltage. Further, in a switching circuit the prevention of saturation by the switching transistor is purely a static condition and there is no need to continuously and automatically adjust the driving current of the transistor as a function of a varying collector voltage, as there is in a modulated amplifier.

SUMMARY OF THE INVENTION

In one embodiment of the invention, a carrier signal is impressed upon the base electrode of a transistor to generate an output signal and a modulation signal is impressed upon the collector electrode to modulate the output. A current diverting means is connected between the base circuit and the collector electrode of the transistor. The current diverting means is actuated in response to an approaching condition of saturation in the transistor to divert base current from the base electrode to the collector electrode of the transistor to prevent saturation and the deleterious affect of excessive conduction angles are mitigated so that the amplifier continuously operates at maximum efficiency.

BRIEF DESCRIPTION OF THE DRAWING

The nature of the present invention and its various advantages will appear more fully by referring to the following detailed description in conjunction with the appended drawing, in which:

FIG. 1 is a schematic drawing of a modulated transistor amplifier circuit constructed in accordance with the invention;

FIGS. 2A and 2B are a set of curves showing collector voltage and collector current, respectively, of a transistor as it undergoes saturation and desaturation with a normal conduction angle and an extended conduction angle due to minority carrier storage in the collector region of the transistor; and FIG. 3 is a characteristic curve showing the diversion of base current in the transistor shown in FIG. 1 for various values of collector voltage.

DETAILED DESCRIPTION

Referring now in more detail to FIG. 1 of the drawing, a source of radio frequency carrier voltage 11 is connected to the base electrode of a transistor 12 through a coupling capacitor 13. The emitter electrode of the transistor 12 is grounded and a source of negative bias potential 14 is connected to the base electrode through an isolation coil 15. One end of a tank circuit 16, comprising a capacitor 17 in parallel with an induction coil 18, is connected to the collector electrode of the transistor 12. The other end of the tank circuit 16 is connected in series with the secondary winding 19 of a modulation transformer 23 and a positive collector bias source 24. The negative side of the source 24 is grounded. The induction coil 18 is also the primary winding of an output transformer 25, the secondary winding 26 of which is coupled to an output illustrated as a load resistor 27. The primary winding 22 of the modulation transformer 23 is connected to a source of varying modulation voltage 29. An input current control diode 28 is connected from between the carrier source 11 and the coupling capacitor 13 to the collector electrode of the transistor 12.

In operation, the bias source 14 may be adjusted to apply a negative potential $V_{bias}$ of approximately 0.75 volt to the base electrode of the transistor 12. Normally, the base electrode of a grounded emitter silicon transistor must be raised to approximately +0.75 volt to overcome the base-emitter voltage drop $V_{be}$ of the transistor and initiate conduction in the emitter-collector path. However, due to the bias potential $V_{bias}$ of −0.75 applied to the base of the transistor 12, the base electrode must be raised by approximately +1.5 volts to initiate conduction. Further, the transistor 12 as shown in FIG. 1, is an NPN type which is driven into conduction by the positive portion of a sinusoidal base signal. It is to be understood that a PNP transistor and a negative base signal and bias voltage would work in the same manner. With a PNP transistor, the polarity of the diode 28 must be reversed from that shown in FIG. 1 so that the cathode electrode is connected to the base circuit of the transistor 12. The collector bias voltage 24 may typically be +5 volts and the modulation source voltage 29 may vary between +5 volts. Thus, when the modulation voltage is at its maximum value of +5 volts a total of 10 volts is applied to the collector of the transistor 12. As the carrier voltage from the source 11 is applied to the base electrode of the transistor 12, the resultant output voltage at the collecor of the transistor 12 is applied to the tank circuit 16. The tank circuit 16 is tuned to the frequency of operation and provides in a well known manner, a sinusoidal output voltage at the collector which is twice the applied voltage, or 20 volts peak, in the example given. The output voltage produced by the tank circuit 16 is applied in series with the secondary winding 19 of the modulation transformer 23. A voltage from the modulation source 29 is superimposed upon the collector bias voltage to vary the collector voltage of the transistor 12 and modulate the output voltage. The modulated output voltage is coupled from the primary coil 18 to the load resistor 27 through the secondary winding 26 of the transformer 25.

If a peak carrier voltage value is chosen so that the transistor 12 is driven to saturation condition on each cycle of the carrier when the total collector voltage is a maximum of 20 volts that same peak carrier voltage will drive the transistor deeply into saturation when the modulation voltage, and hence the total collector, voltage is smaller.

When a mesa or planar type transistor is saturated an effect known as minority carrier storage occurs in the collector region of the transistor. Current must be delivered to the stored charges to neutralize them before the current flow through the transistor can be decreased. Because of this storage effect, a finite period of time is required to dissipate the charges before the transistor may be brought out of saturation and returned to a cutoff condition. If the transistor is being driven at radio frequencies, the finite storage dissipation time will result in an increase in the conduction angle of the transistor due to the additional time required to drive the transistor from saturation to cutoff.

Referring to FIG. 2 of the drawing, FIG. 2A and FIG. 2B shown, respectively, the collector voltage $V_{ce}$ characteristic and the collector current $I_c$ characteristic of a transistor with respect to time $t$ or conduction angle as saturation and desaturation of the transistor occur. The solid lines on the figures represent the characteristics of the transistor over a normal conduction angle, during a single cycle of the impressed R–F carrier, while the dashed lines represent the characteristics of the transistor as its conduction angle is increased due to minority carrier storage in the collector region. As can be seen from FIG. 2A, the collector voltage at saturation remains substantially the same when the conduction angle is increased, approximately 0.2 volt for a silicon transistor. However, the collector current $I_c$, of FIG. 2B, decreases sligthly in maximum value as the conduction angle is increased but the current continues to flow over a substantially longer period of time. In the case of the lengthened conduction angle, the longer period of current flow at substantially the same collector voltage results in a greater amount of power being dissipated in the transistor and, hence, a decrease in the collector efficiency of the transistor. Varying collector efficiency results in nonlinearity in the output signal of a modulated amplifier.

In order to alleviate the problems introduced by minority carriage storage in the modulated transistor amplifier of FIG. 1, the diode 28 is connected from between the carrier voltage source 11 and the coupling capacitor 13, i.e., the base circuit, to the collector electrode of the transistor 12. The diode 28 has a forward threshold voltage $V_f$ of approximately +0.75 volt; that is, when the diode is conducting in the forward direction it produces a voltage drop of 0.75 volt.

Without the diode 28 in the circuit, as the transistor 12 approaches a condition of saturation, its collector-emitter voltage $V_{ce}$ decreases and reaches a minimum value of approximately 0.2 volt at absolute saturation. However, with the diode 28, as the transistor 12 approaches a condition of saturation, the collector voltage, and hence, the voltage applied to the cathode of the diode, decreases to a point at which the voltage across the diode 28 exceeds its threshold voltage and current flows from the base circuit to the collector electrode. That is, as the transistor 12 approaches saturation at any instantaneous collector voltage all base current in excess of that which is required to just barely saturate the transistor will be diverted when the following condition occurs:

$$V_{ce}+V_f<V_{be}+V_{bias}$$

As can be seen from this relation the "degree of saturation," that is, the minimum value of $V_{ce}$, may be controlled by varying the value of $V_{bias}$, since the values of $V_{be}$ and $V_f$ are fixed. For the example values given of $V_{be}=0.75$, $V_f=0.75$ and $V_{bias}=0.75$, the $V_{ce}$ of the transistor 12 is held to approximately 0.75 volt and will never go deeply into saturation.

Referring to FIG. 3, the base current characteristic of the transistor 12 is shown at various values of collector voltage. The dashed lines represent the limitations on base current due to the current diverting effects of the diode 28. The peak value of the carrier voltage from the source 11 is adjusted to drive the transistor 12 to the point of saturation when the modulation voltage is at a maximum value of +5 volts (dashed line 31 of FIG. 3). As the collector voltage $V_{ce}$ of the transistor 12 decreases (dashed lines 32 and 33 of FIG. 3) due to a decrease in modulation potential, the diode 28 serves to divert base current from the base of the transistor 12 through the diode 28 into the collector of the transistor and prevent the transistor from saturating. This diversion of base current through the diode 28 keeps the transistor from going into saturation and thereby prevents the corresponding increase in conduction angle and its associated decrease in collector efficiency. Holding a substantially constant collector efficiency in the transistor 12 serves to maintain linear modulation in the output waveform of the amplifier. Although the base current which is injected into the collector electrode of the transistor 12 by the diode 28 may slightly distort the output signal of the transistor, this distortion is considerably less severe than that which would result from over driving and saturating the transistor.

It is to be understood that the above-described embodiments are simply illustrative of the invention and that many other embodiments can be devised without departing from the scope and spirit of the invention.

What is claimed is:

1. A method of operating a single-stage transistor amplifier as a substantially linear amplitude modulator, which comprises the steps of:

applying a carrier signal current to the base of the transistor to establish a corresponding level of collector voltage;

applying a modulating signal to the collector-emitter path of the transistor to vary the collector voltage established by the carrier signal current;

adjusting the level of the carrier signal current applied to the base until the transistor approaches saturation when the modulated collector voltage is at its maximum value; and diverting the adjusted carrier signal current from the base to the collector when the modulated collector voltage decreases from its maximum value.

References Cited

UNITED STATES PATENTS

| | | | |
|---|---|---|---|
| 2,644,925 | 7/1953 | Koros. | |
| 3,003,122 | 10/1961 | Gerhard | 332—31 X |
| 3,225,217 | 12/1965 | Corney | 307—300 X |

OTHER REFERENCES

Benima: "Transistor Saturation Control," RCA Tech. Notes, No. 552, March 1964.

ALFRED L. BRODY, Primary Examiner

U.S. Cl. X.R.

307—237, 246; 330—24; 332—37, 49